US008654147B2

(12) United States Patent
Hitosugi

(10) Patent No.: US 8,654,147 B2
(45) Date of Patent: Feb. 18, 2014

(54) APPARATUS FOR GENERATING RASTER IMAGES, RASTER IMAGE GENERATING METHOD, AND STORAGE MEDIUM

(75) Inventor: Takayuki Hitosugi, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 13/037,037

(22) Filed: Feb. 28, 2011

(65) Prior Publication Data

US 2011/0216086 A1 Sep. 8, 2011

(30) Foreign Application Priority Data

Mar. 2, 2010 (JP) ................................ 2010-045543

(51) Int. Cl.
*G09G 5/00* (2006.01)
*G09G 5/02* (2006.01)
*G06K 9/00* (2006.01)

(52) U.S. Cl.
USPC ............................ 345/629; 345/589; 382/162

(58) Field of Classification Search
USPC .......................................................... 345/629
See application file for complete search history.

(56) References Cited

U.S. PATENT DOCUMENTS

| | | | | |
|---|---|---|---|---|
| 5,046,119 | A * | 9/1991 | Hoffert et al. | 382/166 |
| 5,999,710 | A * | 12/1999 | Smith et al. | 358/1.15 |
| 6,049,390 | A * | 4/2000 | Notredame et al. | 358/1.15 |
| 7,062,087 | B1 * | 6/2006 | Varga | 382/166 |
| 7,119,815 | B1 * | 10/2006 | Cahill, III | 345/629 |
| 7,483,036 | B2 * | 1/2009 | Moore | 345/589 |
| 2008/0137961 | A1 * | 6/2008 | Ishida et al. | 382/197 |
| 2008/0225345 | A1 * | 9/2008 | Nakanishi et al. | 358/448 |

FOREIGN PATENT DOCUMENTS

| | | |
|---|---|---|
| JP | 2001-111805 A | 4/2001 |
| JP | 2008-228168 A | 9/2008 |

* cited by examiner

*Primary Examiner* — Kee M Tung
*Assistant Examiner* — Haixia Du
(74) *Attorney, Agent, or Firm* — Canon USA Inc. IP Division

(57) ABSTRACT

An apparatus segments an image region of raster image data. The apparatus converts an image region where same-colored data continues in a range of equal to or greater than a threshold value into solid-colored data. The apparatus switches between compositing processing procedures for each image region.

6 Claims, 16 Drawing Sheets

APPARATUS FOR GENERATING RASTER IMAGES, RASTER IMAGE GENERATING METHOD, AND STORAGE MEDIUM

BACKGROUND OF THE INVENTION

1. Field of the Invention

The present invention relates to an apparatus for generating raster images, a raster image generating method, and a storage medium.

2. Description of the Related Art

Compositing processing in rendering processing is processing in which a front image and a back image are combined to form a resultant image.

Further, as a technique for achieving high-speed processing by reducing a load on a central processing unit (CPU) in alpha blending, Japanese Patent Application Laid-Open No. 2008-228168 is available. Japanese Patent Application Laid-Open No. 2008-228168 discusses a method for generating a pixel value and an alpha value of each image element in a run-length format, expanding the generated data in the run-length format, and performing a compositing operation on the pixel value and the alpha value for each one pixel.

SUMMARY OF THE INVENTION

According to an aspect of the present invention, an apparatus includes a generation unit configured to generate a bit-mapped object in which color data is defined with respect to each pixel position of a region where same-colored data does not continue in a range of equal to or greater than a threshold value, and a flat-filled object in which color data is defined with respect a region where same-colored data continues in a range of equal to or greater than the threshold value, from a raster image in which color data is defined for each pixel position, and a drawing unit configured to, when combining two objects including the bit-mapped object generated by the generation unit and a solid-colored object in which color data is defined with respect to an object, perform a compositing operation on color data of the bit-mapped object and color data of the solid-colored object in a region where the two objects overlap each other for each pixel position, and write each color data which has been subjected to the compositing operation into each pixel position in the region where the two objects overlap each other, and when combining two objects including the flat-filled object generated by the generation unit and the solid-colored object, perform a compositing operation once on color data of the two objects, and write color data which has been subjected to the compositing operation into each pixel position in a region where the two objects overlap each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
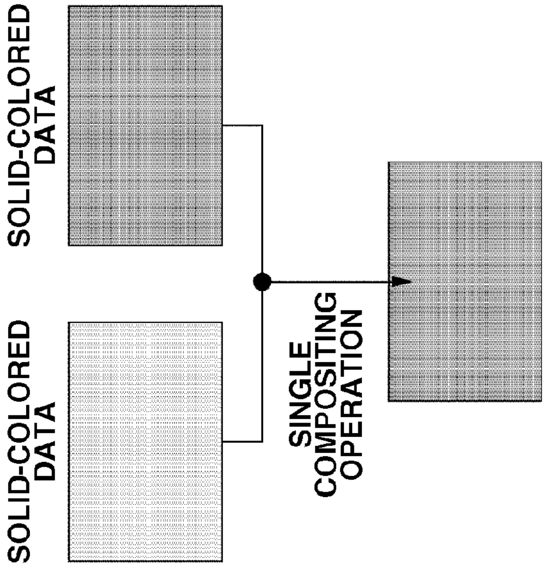
FIGS. 1A and 1B illustrate examples of normal compositing processing according to a first exemplary embodiment of the present invention.
Figure 1B:
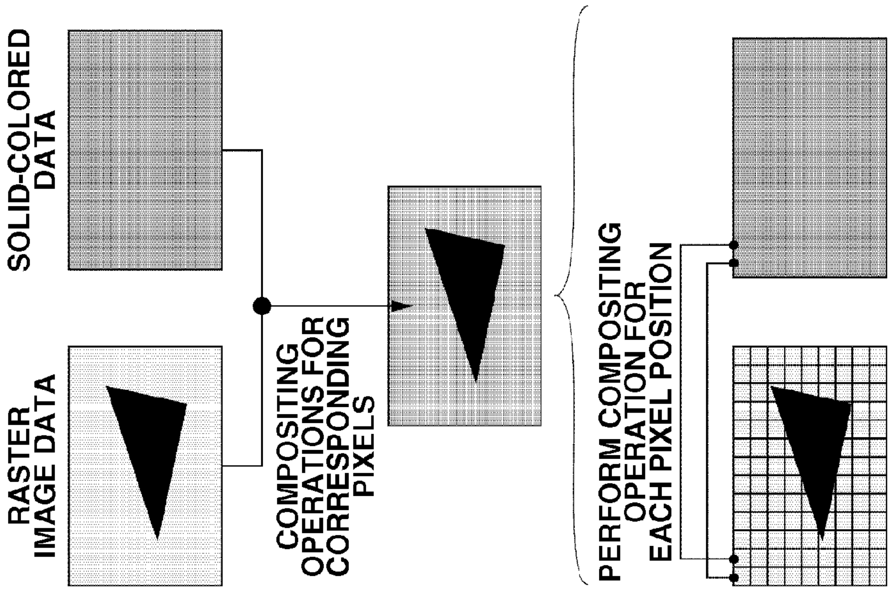

FIGS. 1A and 1B illustrate examples of compositing processing. FIG. 1A illustrates compositing processing in a case where pieces of solid-colored data are combined with each other. More specifically, for example, objects, in which solid-colored data is defined with respect to each object, are given. FIG. 1B illustrates compositing processing in a case where raster image data and solid-colored data are combined with each other. Since FIG. 1A illustrates the case of mutually solid-colored data, only one compositing operation is required. This is because, in a region where two graphics overlap each other, all become the same color data. However, since FIG. 1B illustrates a case where the one is raster image data, it is necessary to perform a compositing operation for each pixel position, when compositing processing is performed. This is because the raster image differs from an image of the solid-colored data, and there is a possibility that not all pixel positions of the raster image have the same color data. For this reason, it is required to perform a compositing operation for each one pixel. As a result, a decrease in rendering rate occurs in comparison with the case where the raster image is not combined with the solid-colored data.

Thus, in the first exemplary embodiment of the present invention, there is discussed a method in which it becomes possible to make a number of times of compositing operations less than that in the conventional method, in a case where the a raster image in which a single color continues in a wide range of an image region and the solid-colored data are combined.

Now, the terms used in the first exemplary embodiment will be described. As types of objects, a raster image and a flat graphic exist. Raster image refers to an object which is classified as a bit-mapped graphics, including, e.g., photograph data such as Bitmap (BMP) and Joint Photographic Experts Group (JPEG). Flat graphics according to the first exemplary embodiment refers to a vector graphics, and an object in which color data of single color is defined with respect to an object. In the first exemplary embodiment, the object is referred to as a solid-colored object. Also, a plurality of types of other objects exists, which includes gradation graphics and text, for example.

Further, the raster image is segmented into at least one image region, out of two image regions of a flat-filled portion and a bit-mapped portion, by executing image region segmentation processing described below. Respective segmented image regions are handled as separate objects. That is, the raster image as an object is to be segmented into a plurality of objects. For this reason, the flat-filled portion is also referred to as a flat-filled object, and the bit-mapped portion as a bit-mapped object.

Figure 2:
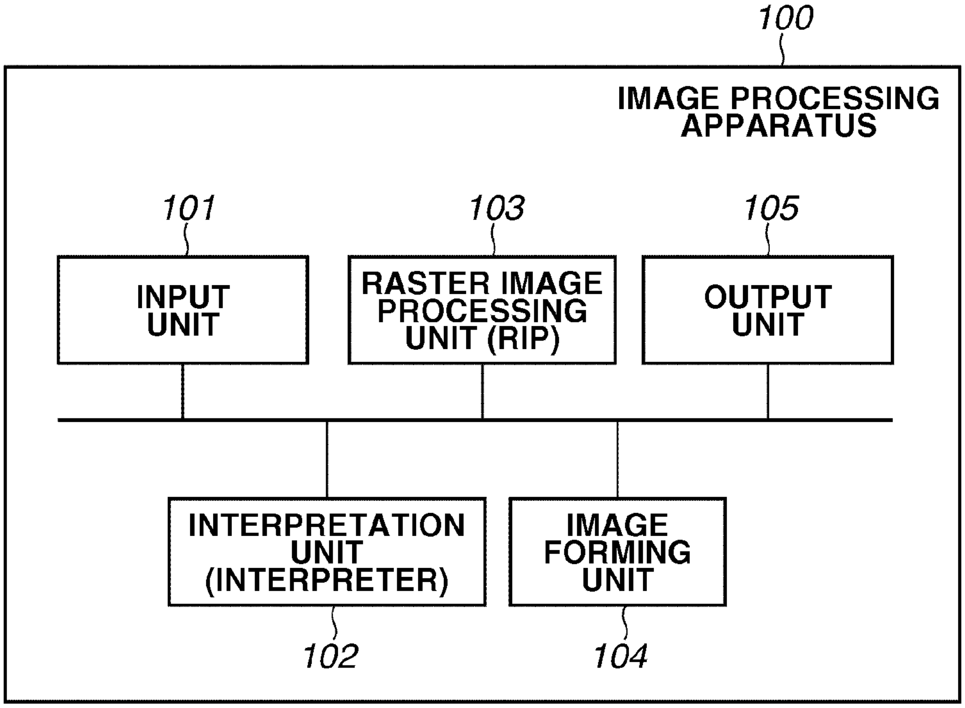
FIG. 2 illustrates a configuration of an image processing apparatus according to the first exemplary embodiment.

Hereinbelow, referring to FIG. 2, a configuration of an image processing apparatus according to the first exemplary embodiment will be described in detail. FIG. 2 illustrates a configuration of an image processing apparatus 100 according to the first exemplary embodiment.

The image processing apparatus 100 is an apparatus that forms and outputs an image based on a drawing command, and includes an input unit 101, an interpretation unit (interpreter) 102, a raster image processing unit (RIP) 103, an image forming unit 104, and an output unit 105.

The input unit 101 is an area that receives a drawing command from an external apparatus connected to the image processing apparatus 100. The interpretation unit (interpreter) 102 is an area that interprets the drawing command received by the input unit 101. A format of the drawing command according to the first exemplary embodiment is a page-description language (PDL). The RIP 103 performs rendering based on the drawing command interpreted by the interpretation unit (interpreter) 102, and generates a raster image. The image forming unit 104 effects image processing such as halftone processing on the raster image generated by the RIP 103, and forms an output image. The output unit 105 outputs the output image formed by the image forming unit 104. The image processing apparatus 100 according to the first exemplary embodiment is a multifunction peripheral (MFP), and the output unit 105 outputs the output image by printing it on a recording sheet. The interpretation unit (interpreter) 102 is implemented by causing a central processing unit (CPU) to execute a program for implementing the interpreter. The RIP 103 is implemented by causing the CPU to execute a program for implementing the raster image processing unit 103. The image forming unit 104 is implemented by causing the CPU to execute an image forming program. Respective programs are loaded into a random access memory (RAM), and are implemented by causing the CPU to execute them. The RIP 103 may be implemented by dedicated hardware for generating the raster image, instead of the CPU. It is conceivable to cause, for example, application specific integrated circuits (ASIC) to execute the functions of the raster image processing unit.

Figure 3:
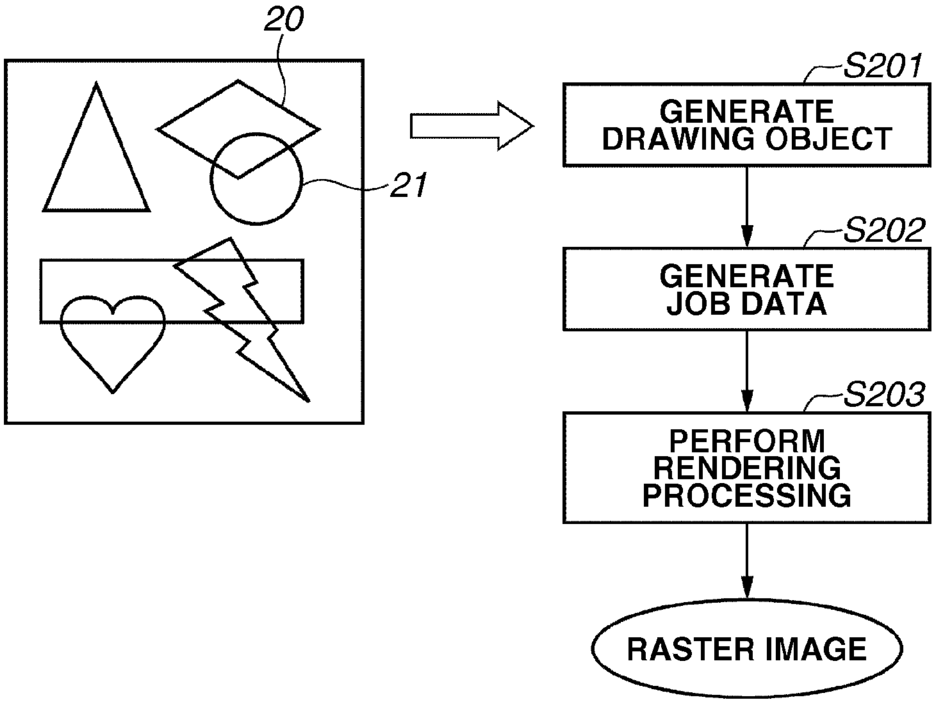
FIG. 3 is a flowchart of raster image generating processing by a raster image processing unit (RIP) according to the first exemplary embodiment.

Next, processing for generating a raster image by the RIP 103 will be described in detail. FIG. 3 is a flowchart illustrating raster image generation processing by the RIP 103. In step S201, the RIP 103 generates an object based on the drawing command interpreted by the interpretation unit (interpreter) 102 in FIG. 2. As described above, a plurality of types of objects (paint types) exists, and each object is classified as either of types of objects (paint types).

As illustrated in FIG. 3, drawing regions of a plurality of objects may overlap each other. For example, in FIG. 3, a rhombus 20 as a back image and a circle 21 as a front image overlap each other. In a case where the rhombus 20 and the circle 21 are not combined as transparent compositing, an overlapped portion is drawn as color data of the circle 21. In the case of transparent compositing, color data computed by transparent compositing operation on the rhombus 20 and the circle 21 is drawn.

Subsequently, in step S202, the raster image processing unit (RIP) 103 detects edges of respective objects and generates job data, according to coordinate information of the object generated in step S201. Finally, in step S203, the RIP 103 performs rendering processing of the raster image according to the job data generated in step S202. The job data will be described below.

Figure 4:
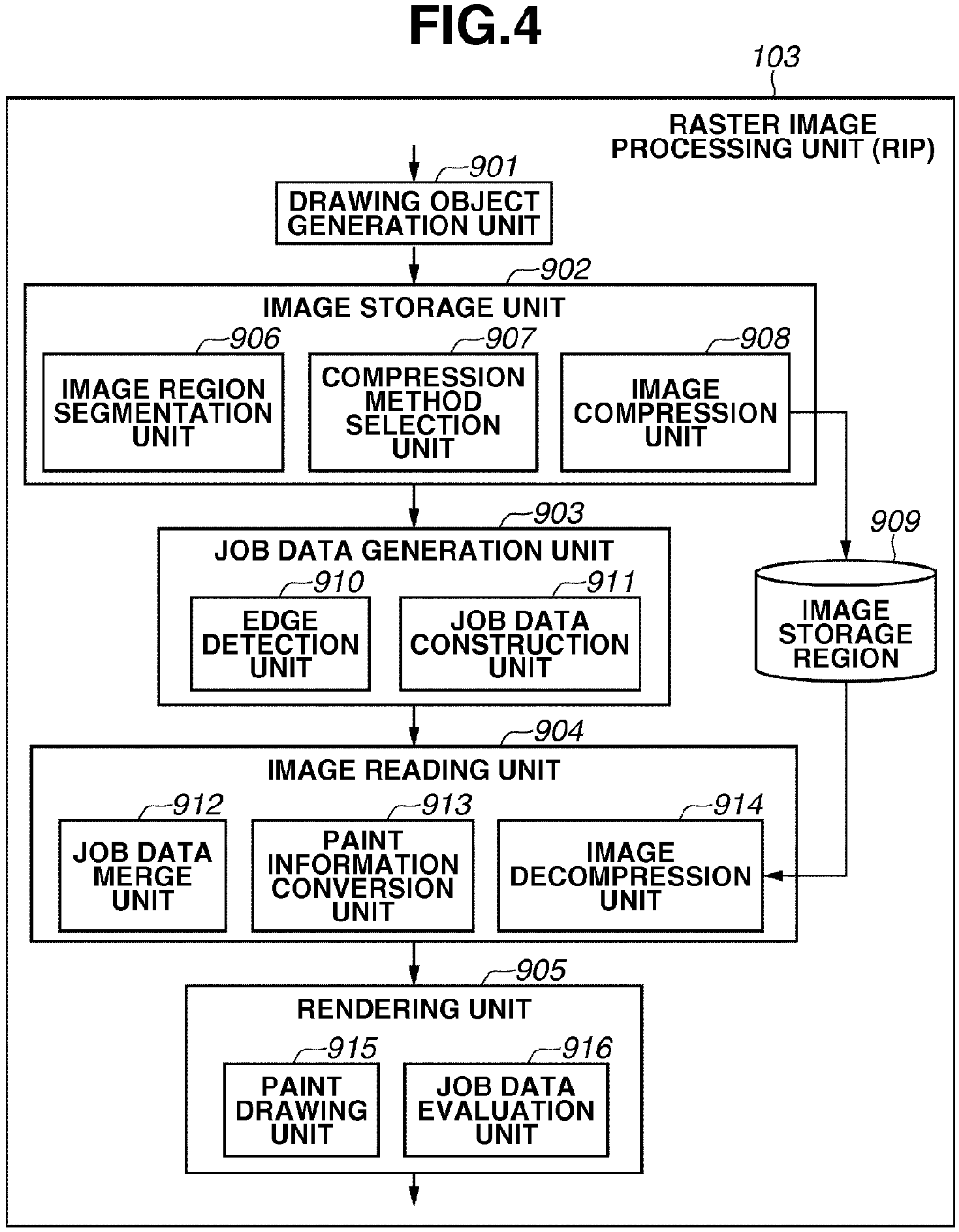
FIG. 4 illustrates various types of functions of the RIP according to the first exemplary embodiment.

Next, a configuration of the RIP 103 will be described in detail. FIG. 4 illustrates various types of functions of the RIP 103. The RIP 103 includes a drawing object generation unit 901, an image storage unit 902, a job data generation unit 903, an image reading unit 904, a rendering unit 905, and an image storage region 909. The drawing object generation unit 901 receives the drawing command interpreted by the interpretation unit (interpreter) 102, and generates an object.

The image storage unit 902 includes an image region segmentation unit 906, a compression method selection unit 907, and an image compression unit 908. The image region segmentation unit 906 performs image region segmentation on an object of the raster image into a flat-filled portion and a bit-mapped portion. A segmentation method will be described below.

The compression method selection unit 907 selects compression methods suitable for respective image regions, with respect to each image region that has been subjected to image region segmentation. In the first exemplary embodiment, JPEG is supposed to be selected as a compression method for the bit-mapped portion. The image compression unit 908 performs image compression on each image region that has been subjected to image region segmentation in accordance with the selected compression method. The raster image data in each compressed image region is stored in the image storage region 909. A compression method of the flat-filled portion will be described below.

The job data generation unit 903 includes an edge detection unit 910 and a job data construction unit 911. The edge detection unit 910 detects edges of an object. The job data construction unit 911 generates job data composed of side information, paint compositing store, and paint information. Job data generation processing by the job data generation unit 903 will be described below.

The image reading unit 904 includes an image decompression unit 914, a paint information conversion unit 913, and a job data merge unit 912. The image decompression unit 914 decompresses a raster image saved in the image storage region 909. The paint information conversion unit 913 converts the raster image decompressed by the image decompression unit 914 into equivalent paint information by image region. More specifically, paint information of the flat-filled portion is converted into equivalent and solid-colored data. In the first exemplary embodiment, like the flat graphics, the converted flat-filled portion is handled as a solid-colored object. Moreover, the paint information of the bit-mapped portion is converted into color data of the bit-mapped portion. Since the color data of the bit-mapped portion is a portion of the segmented raster image, the color data is defined with respect to each pixel position. Hence, when the color data of the bit-mapped portion is mentioned, it might be said to be the color data at each pixel position in the segmented raster image (bit-mapped portion).

The job data merge unit 912 merges the job data generated by the job data generation unit 903 with paint information of the raster image converted by the paint information conversion unit 913. Accordingly, the job data merge unit 912 updates side information, paint compositing store, and paint information of the job data. Job data merge processing will be described below.

The rendering unit 905 includes a job data evaluation unit 916 and a paint drawing unit 915. The job data evaluation unit 916 performs a compositing operation in order to turn paint node group retained in respective paint compositing records into a single paint node. The paint drawing unit 915 sets a raster pixel value in each pixel position of the paint region as a value obtained from the compositing operation performed by the job data evaluation unit 916, and writes it into a storage region of the corresponding raster image. The raster image is generated by performing the processing with respect to all paint regions.

Figure 5:
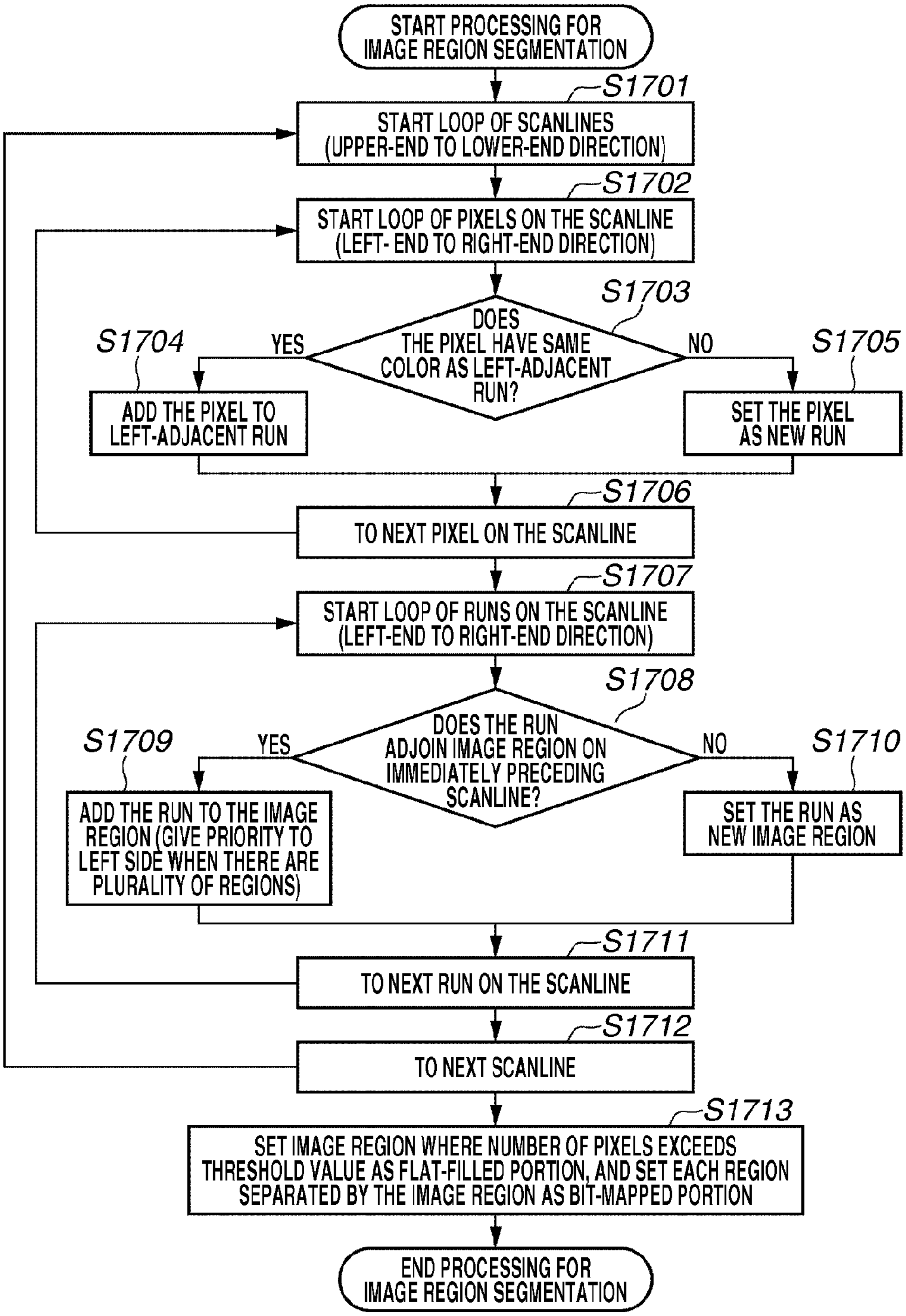
FIG. 5 is a flowchart of image region segmentation processing by an image region segmentation unit according to the first exemplary embodiment.

Next, image region segmentation processing by the image region segmentation unit 906 will be described in detail. The image region segmentation processing is started from reading out raster images for each one line. The image region segmentation unit 906 reads out raster images for each one line relative to a main-scanning direction of the image processing apparatus 100. FIG. 5 is a flowchart illustrating image region segmentation processing.

First, in step S1701, the image region segmentation unit 906 reads out a particular scanline, and starts a loop of scanlines. If the image region segmentation unit 906 has read out a scanline at upper-end in step S1701, then in step S1702, the image region segmentation unit 906 reads out a left-end pixel on the read-out scanline, and starts a loop of pixels. If the image region segmentation unit 906 has read out the left-end pixel on the scanline in step S1702, then in step S1703, the image region segmentation unit 906 determines whether the read-out pixel has the same color as that of a left-adjacent run. If it is determined that the read-out pixel has the same color as that of the left-adjacent run in step S1703, then in step S1704, the image region segmentation unit 906 adds the read-out pixel to the left-adjacent run. If it is not determined that the read pixel has the same color as that of the left-adjacent run in step S1703 (including the case where the read-out pixel was leftmost in the scanline), then in step S1705, the image region segmentation unit 906 sets the read-out pixel as a new run. If the processing in step S1704 or step S1705 ends, then in step S1706, the image region segmentation unit 906 moves from the read-out pixel to a next pixel. The image region segmentation unit 906 reads out color data of the moved pixel, and starts processing from step S1702. In step S1706, if the image region segmentation unit 906 has effected the processing in step S1704 or step S1705, on all of the read-out pixels on the scanline, the image region segmentation unit 906 shifts processing to step S1707.

In step S1707, the image region segmentation unit 906 reads out a left-end run on the read-out scanline, and the image region segmentation unit 906 starts a loop of runs. In step S1708, the image region segmentation unit 906 determines whether runs that have the same color as the read-out run exist on one preceding scanline, and these are adjacent to each other. If it is determined that the runs are adjacent to each other (YES in step S1708), then in step S1709, the image region segmentation unit 906 adds the read-out run to the runs on one preceding scanline, and updates the image region. If it is determined that the runs are not adjacent to each other (NO in step S1708), then in step S1710, the image region segmentation unit 906 sets the read-out run as a new image region. If the processing in step S1709 or step S1710 ends, then in step S1711, the image region segmentation unit 906 moves from the read-out run to a next run. The image region segmentation unit 906 reads out color data in the moved run, and starts processing from step S1707. In step S1711, if the image region segmentation unit 906 has effected the processing in step S1709 or step S1710, on all of the runs on the read-out scanline, the image region segmentation unit 906 shifts processing to step S1712.

In step S1712, the image region segmentation unit 906 moves from the read-out scanline to the next scanline. The image region segmentation unit 906 reads out a scanline in the moved run, and starts processing from step S1701. In step S1712, if the image region segmentation unit 906 has read out all scanlines in the raster image, it shifts processing to step S1713. In step S1713, the image region segmentation unit 906 counts the number of pixels in respective image regions of the raster image, and sets an image region where the number of pixels exceeds a threshold value (the same color continues in a range of equal to or greater than the threshold value) as a flat-filled portion, and sets an image region where the number of pixels does not exceed the threshold value (the same color does not continue in a range of equal to or greater than the threshold value) as a bit-mapped portion. The flat-filled portion and the bit-mapped portion are each handled as separate objects, as a result that the raster image as an object has been separated. The image region segmentation unit 906 performs image region segmentation processing, as described hereinbefore.

Figure 6:
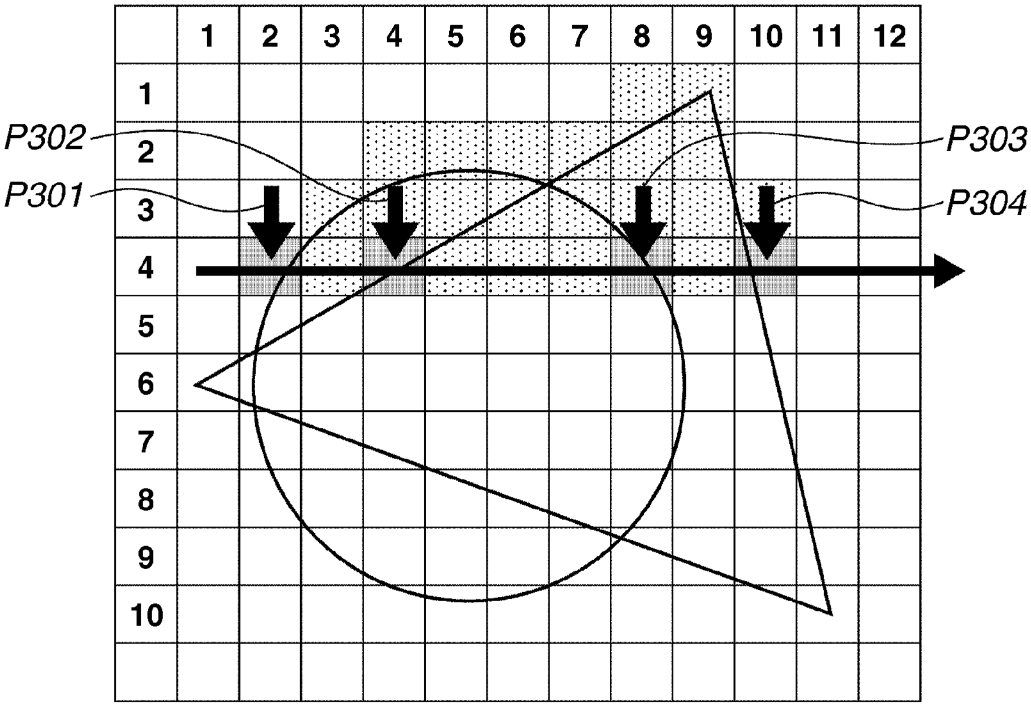
FIG. 6 illustrates a manner in which a scanline (horizontal line) intersects objects according to the first exemplary embodiment.

Next, job data generation processing by the job data generation unit 903 will be described in detail. The job data generation processing refers to processing for extracting contour points of an object by edge detection processing, and generating job data. FIG. 6 illustrates a manner in which a scanline (horizontal line) intersects with objects.

As indicated by an arrow (the fourth line) in FIG. 6, four contour points are extracted. As illustrated in FIG. 6, points (pixels) at which the scanline and objects intersect with each other are treated as contour points. In FIG. 6, points P301, P302, P303, and P304 are extracted as the contour points. As illustrated in FIG. 6, like the contour points P302 and P303, new contour points are to be extracted with regard to regions where the objects overlap each other. By performing processing for extracting the contour points, with respect to respective scanlines (from the first line to the tenth line in FIG. 6) in a drawing range, it becomes possible to detect regions (paint regions) divided by the objects.

To describe a concrete example of the paint regions (paint regions) based on FIG. 6, a region from the left end to the contour point P301 constitutes one paint region, which becomes a first paint region. A region from the contour point P301 to P302 constitutes one paint region, which becomes a second paint region. A region from the contour point P302 to P303 constitutes one paint region, which becomes a third paint region. A region from the contour point P303 to P304 constitutes one paint region, which becomes a fourth paint region. Finally, a region from the contour point P304 to the right end constitutes one paint region, which becomes a fifth paint region. Since the first paint region and the fifth paint region are painted with the same background color, the fifth paint region is treated as the first paint region. The paint regions are finalized for each scanline, and the same paint regions are merged with each other in each scanline, to update the paint regions.

Figure 7:
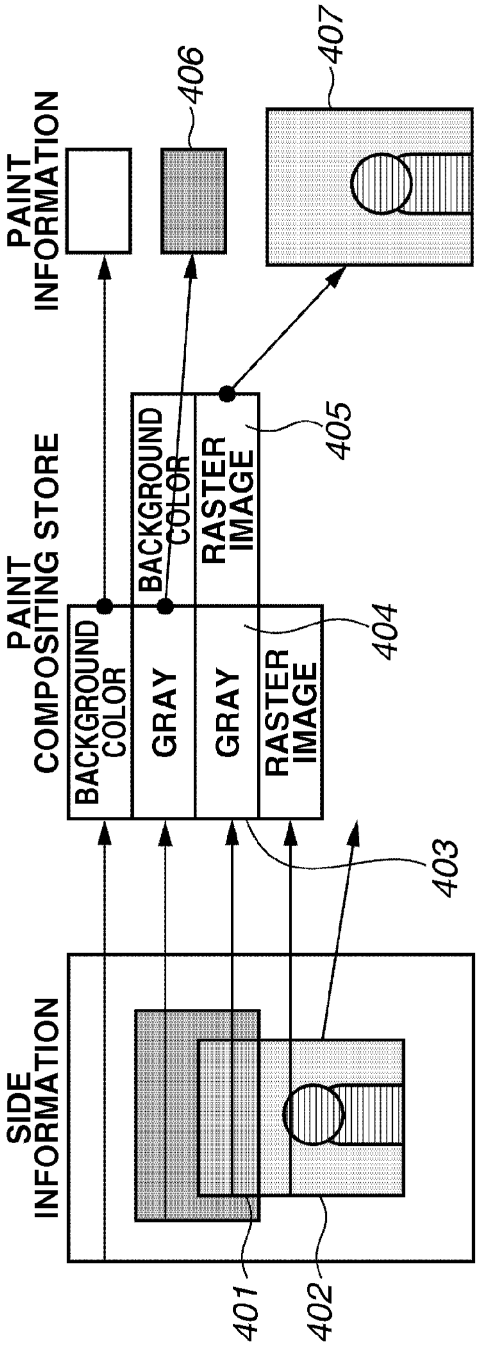
FIG. 7 illustrates a structure of job data generated by a job data generation unit according to the first exemplary embodiment.

FIG. 7 illustrates a structure of job data generated by the job data generation unit 903. The job data is composed of side information, paint compositing store, and paint information. The image data in FIG. 7 is such that an object of flat graphic as a front image and an object of a raster image as a back image overlap each other transparently.

First, side information will be described in detail. In the side information in the job data, information of the paint regions described above is retained. More specifically, in a certain Y coordinate, information of starting positions and ending positions of respective paint regions is retained. To specifically describe with reference to FIG. 6, a starting position 1 and an end position 2 of the first paint region in the fourth line (Y coordinate is 4) are retained. A starting position 10 and an end position 12 of the fifth paint region are retained as the first paint region. Further, regions from positions 1 to 2 on a third line, and regions from positions 11 to 12 on the same third line are retained as the first region. Accordingly, positions of all pixels in respective paint regions can be identified. Each paint region in the side information refers to a record of paint compositing store (paint compositing record) described below. In the example in FIG. 7, a paint region of side information 401 represents a paint region where object elements of a flat graphic type and a raster image type overlap each other, and refers to a paint compositing record 403.

Next, a paint compositing store will be described in detail. The paint compositing store is composed of a plurality of paint compositing records. The paint compositing record is composed of one or a plurality of paint nodes. The paint compositing record retains sequence of the overlap of objects that exist within corresponding paint region on a stack. When the paint compositing record 403 in FIG. 4 is taken as an example, a gray graphic object is more-front than the object of the raster image, and accordingly it is retained at front (left side). Each paint node refers to paint information described below.

Next, paint information will be described in detail. The paint information represents a painting method of an object. That is, it can be said that the paint information is composed of color data. If an object type is a flat graphics, paint information of the flat graphics becomes solid-colored data. If an object type is a raster image, paint information of the raster image becomes color data of the raster image. The color data of the raster image is defined with respect to each pixel position. Hence, when the color data of the raster image is mentioned, it refers to the color data of each pixel position. In the example in FIG. 7, a paint node 404 refers to color data 406 for gray, and a paint node 405 refers to raster image data 407.

Next, job data merge processing will be described. When a drawing object of the raster image is included in a paint compositing record, the paint compositing record and the paint region that refers to it become a target of the merge processing. As a matter of convenience herein, the drawing object of the raster image is supposed to be a raster image element, and the rest of the drawing object to be a non-raster image element.

As a first case, a case where only one raster image element exists in a paint compositing record is described. First, a boundary of image regions in the image region segmentation is mapped at a pixel position within the drawing region. Mapping processing includes scaling by, for example, affine transformation.

Next, new side information is generated by setting a region divided by mapped boundary as a new paint region. The paint region refers to the paint compositing record as described below. If a divided region is a flat-filled portion, the region retains one paint node that refers to converted solid-colored data. If the divided region is a bit-mapped portion, the region retains one paint node that refers to raster image data of the region. Finally, when generation of new side information with respect to all of the divided regions is completed, the paint compositing records before merging are deleted from the paint compositing store. Hereinbefore, merging processing of the first case has been described.

As a second case, a case where one raster image element and one or more non-raster image elements exist in the paint compositing record will be described. Until immediately before new side information is generated, the same processing as the first case is applied. However, a method for generating side information, more specifically, a configuration of the paint nodes of the paint compositing record is different from the first case. In the second case, one paint node corresponding to the flat-filled portion and the bit-mapped portion similar to the first case and one or more paint nodes representing non-raster image elements are retained in the paint compositing record.

Paint nodes representing non-raster image elements are paint nodes excluding raster image elements, out of the paint nodes which the paint compositing record before merging processing has retained. At this time, the paint compositing record is configured to maintain the overlapping sequence of the drawing object elements. When generation of new side information with respect to all of the divided regions is completed, the paint compositing record before merging processing is deleted from the paint compositing store. The above description is the merging processing of the second case.

As a third case, a case where two or more raster image elements exist in the paint compositing record will be described. The processing in the first case, if non-raster image elements do not exist in the paint compositing record, or the processing in the second case, if non-raster image elements exist, is applied to either one of the raster image elements. After application, the processing is also applied to the remaining raster image elements one by one in a similar way. When the application to all of the raster image elements has been completed, merging processing of the third case ends.

Figure 8:
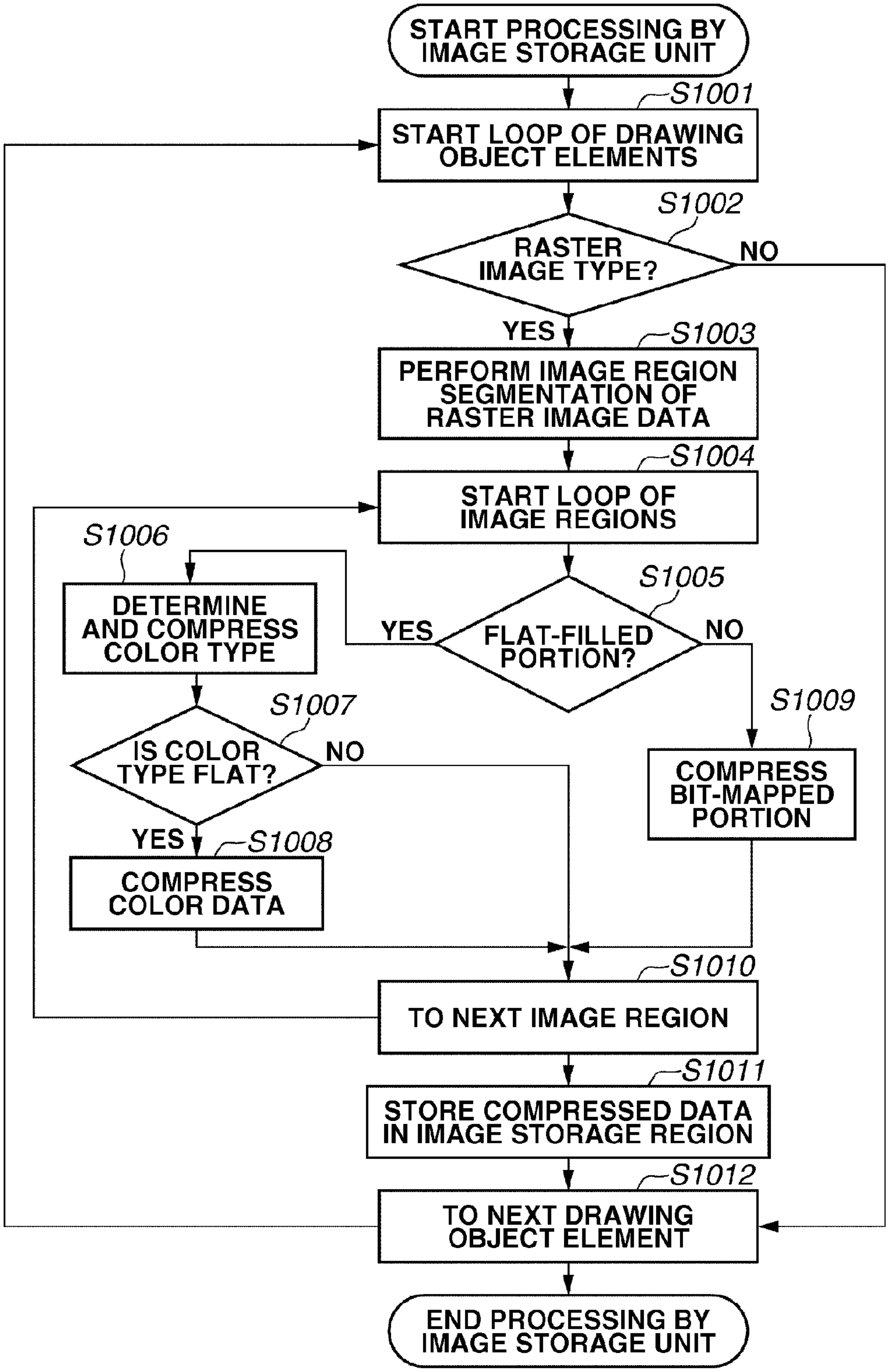
FIG. 8 is a flowchart of processing from image region segmentation to image compression by an image storage unit according to the first exemplary embodiment.

Next, processing from image region segmentation processing to image compression by the image storage unit 902 will be described in detail. FIG. 8 is a flowchart of processing from the image region segmentation to the image compression by the image storage unit 902.

First, in step S1001, the image storage unit 902 reads out a first object from within a drawing range, and starts a loop of object elements. If the image storage unit 902 has read out a particular object in step S1001, then in step S1002, the image storage unit 902 determines whether the read-out object is a raster image. If it is determined that the read-out object is not a raster image (NO in step S1002), then in step S1012, the image storage unit 902 reads out a next object. If it is determined that the read-out object is a raster image (YES in step S1002), then in step S1003, the image storage unit 902 performs image region segmentation of the raster image. If the image storage unit 902 has performed image region segmentation of the raster image in step S1003, then in step S1004, the image storage unit 902 reads out a particular image region, and starts a loop of image regions. In step S1005, the image storage unit 902 determines whether the read-out image region is a flat-filled portion. If it is determined that the read-out image region is not a flat-filled portion (NO in step S1005) (refers to a bit-mapped portion, in the first exemplary embodiment), then in step S1009, the image storage unit 902 compresses the bit-mapped portion. If it is determined that the read-out image region is a flat-filled portion (YES in step S1005), then in step S1006, the image storage unit 902 determines and compresses a color type.

In the first exemplary embodiment, as color types, there exist three types of Foreground, Background, and Flat. Foreground means that RGB values are (0, 0, 0), and Background means that RGB values are (255, 255, 255). In the case of either type out of the two types, since color type and color data correspond to each other, it is not necessary to retain the color data. On the other hand, since Flat indicates color data of the color type other than the above-described two color types, it is necessary to retain the color data. Compression of color type according to the first exemplary embodiment refers to two-bit sign assignment in which Foreground is set to 00, Background to 01, and Flat to 10.

If a color type has been determined in step S1006, then in step S1007, the image storage unit 902 determines whether the color type is Flat. If it is not determined that the color type is not Flat (YES in step S1007), then in step S1008, the image storage unit 902 compresses the color data, since the color type of a particular image region (raster image of the flat-filled portion) is Flat.

Then, compression processing of color data of a raster image of which the color type is Flat will be described. For the raster image before compression, the color data is retained for each pixel position. However, the raster image is converted into a format for retaining the color data for corresponding one pixel by performing compression operation. More specifically, the compressed raster image is converted into a format for retaining the color data for corresponding one pixel, rather than for retaining the color data for each pixel position.

If it is determined that the color type is not Flat (NO in step S1007), or if the processing in step S1008 ends, then in step S1011, the image storage unit 902 reads out a next image region and starts processing from step S1004. If the image storage unit 902 has read out all of the image regions, then in step S1011, the image storage unit 902 stores the compressed data in the image storage region.

If data obtained by compressing the raster image is stored in the image storage region in step S1011, then in step S1012, the image storage unit 902 reads out a next drawing object. If the next drawing object exists, the image storage unit 902 starts processing from step S1001. If the next drawing object does not exist, the processing ends.

Figure 9:
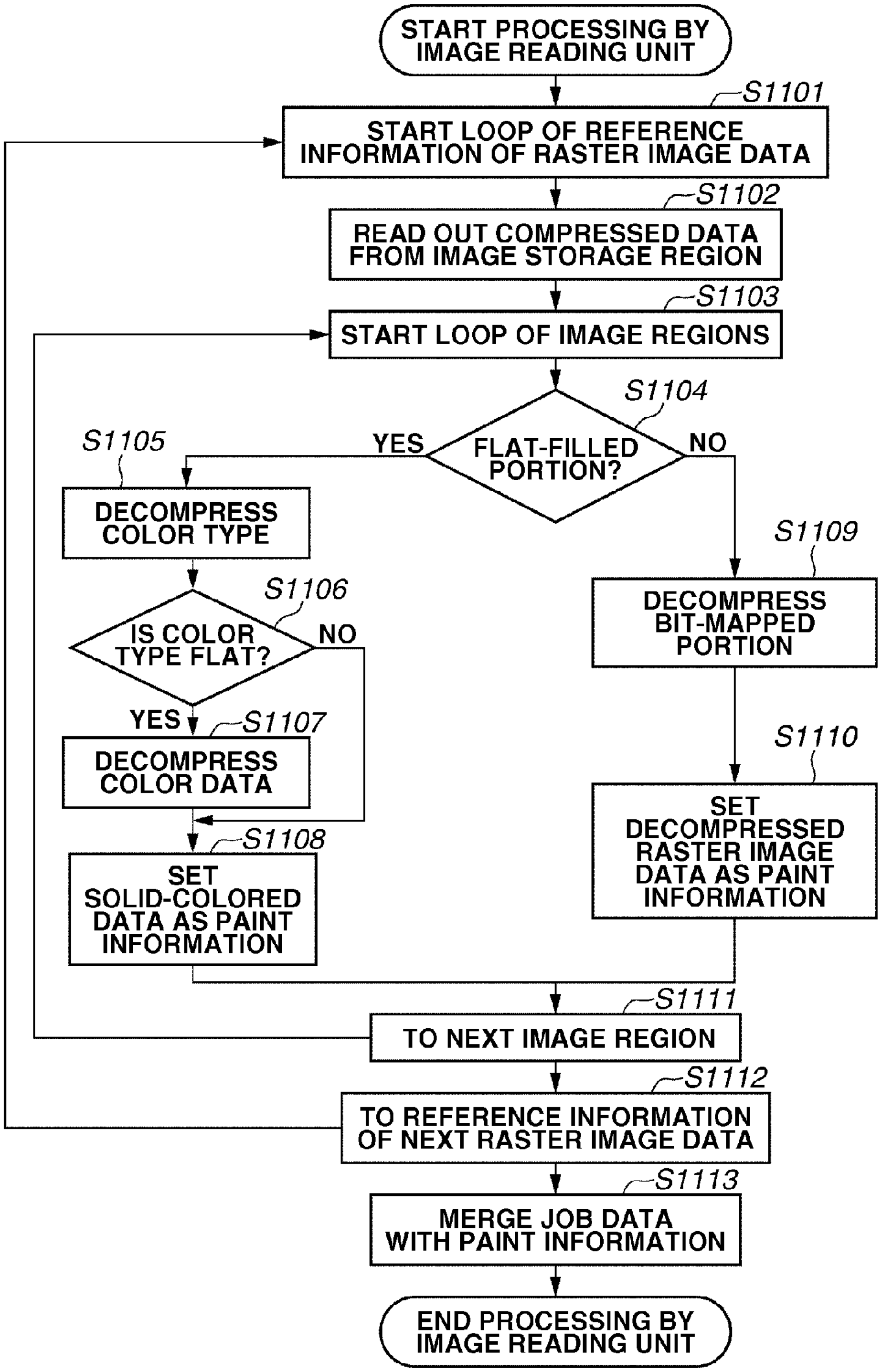
FIG. 9 is a flowchart illustrating processing from image decompression to merging job data by an image reading unit according to the first exemplary embodiment.

Next, processing from image decompression to merging processing of job data by the image reading unit 904 will be described in detail. FIG. 9 is a flowchart illustrating processing from the image decompression to merging the job data by the image reading unit 904.

First, in step S1101, the image reading unit 904 identifies a first raster image based on the job data, and refers to and starts a loop of reference information of the identified raster image. The reference information according to the first exemplary embodiment contains addresses within the image storage region 909 where the compressed data of the raster image exists.

In step S1102, the image reading unit 904 reads out the compressed data of the raster image according to the reference information from the image storage region 909. If the compressed data has been read out in step S1102, then in step S1103, the image reading unit 904 identifies and starts a loop of image regions. If the image regions have been identified in step S1103, then in step S1104, the image reading unit 904 determines whether the image region is a flat-filled portion.

If it is not determined that the image region is a flat-filled portion (NO in step S1104), that is, if the identified image region is a bit-mapped portion, then in step S1109, the image reading unit 904 decompresses the bit-mapped portion. In the first exemplary embodiment, decompression is supposed to be performed according to a decompression algorithm of the JPEG scheme. If an image in the bit-mapped portion has been decompressed in step S1109, then in step S1110, the image reading unit 904 sets the decompressed raster image data as paint information. In other words, since color data is to be defined for each pixel position of the raster image, a compositing operation is to be performed for each pixel position at the time of the compositing of the color data.

If it is determined that the image region is a flat-filled portion (YES in step S1104), then in step S1105, the image reading unit 904 decompresses the color type. More specifically, the image reading unit 904 decompresses and reads out color type 00 as Foreground, color type 01 as Background, and color type 11 as Flat. If the image reading unit 904 has decompressed and read out the color type in step S1105, then in step S1106, the image reading unit 904 determines whether the read-out color type is Flat. If it is not determined that the color type is Flat (NO in step S1106), that is, if it is determined as Foreground or Background, then in step S1108, the image reading unit 904 sets the color data indicated by the color type as paint information of the identified image region. On the other hand, if it is determined that the color type is Flat (YES in step S1106), then in step S1107, the image reading unit 904 decompresses the color data. What color does the color data has can be identified by decompressing the color data. If the color data has been decompressed in step S1107, then in step S1108, the image reading unit 904 sets the identified color data as paint information of the identified image region.

If the processing in step S1108 or step S1110 ends, then in step S1111, the image reading unit 904 identifies a next image region and starts processing from step S1103. If paint information has been determined for all image regions of all pieces of raster image data in step S1112, then in step S1113, the image reading unit 904 merges the job data generated by the job data generation unit 903 with the paint information of all image regions of all pieces of raster image data. As described above, the image reading unit 904 performs merge processing of the job data from the image decompression.

Figure 10:
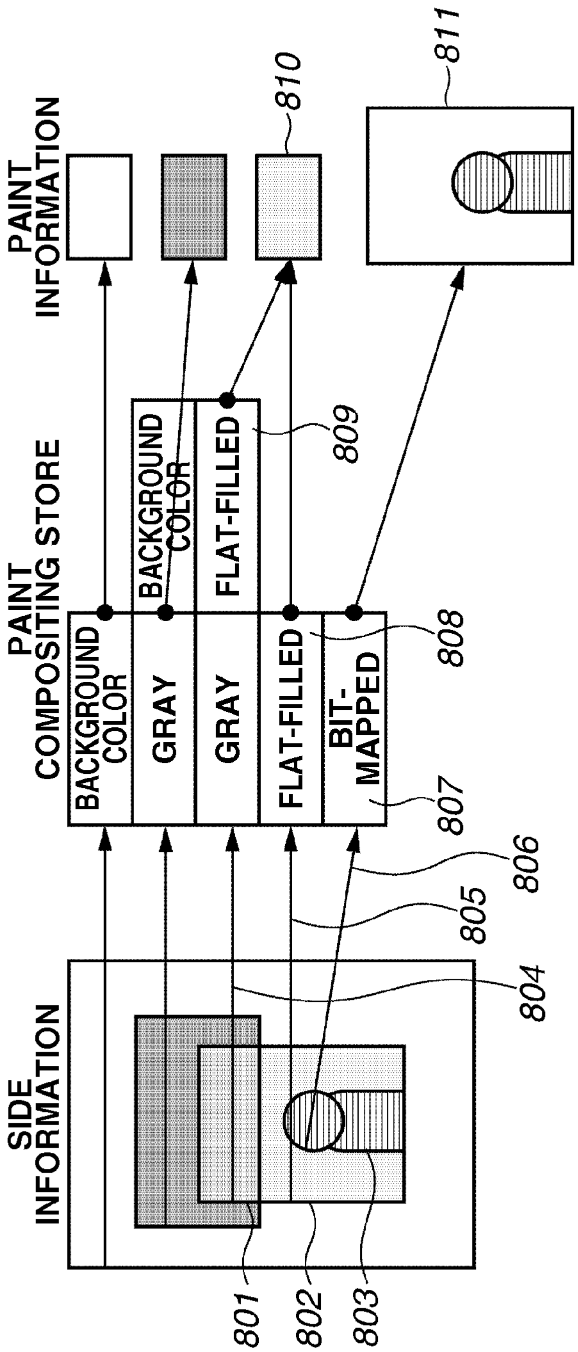
FIG. 10 illustrates a structure of job data after merge processing according to the first exemplary embodiment.

Next, updating of the job data by merge processing will be described. FIG. 10 illustrates a structure of the job data updated through the merge processing by the job data merge unit 912. First, updating of paint information will be described. The paint information 407 is segmented and converted as illustrated in paint information 810 and paint information 811, by the image region segmentation unit 906 and the paint information conversion unit 913, and thus the paint information is updated. The paint information 810 is color data of the flat-filled portion, and the paint information 811 is color data of the bit-mapped portion.

As described above, side information that refers to the paint compositing record in which the paint information is updated becomes a target of the merge processing.

Figure 11:
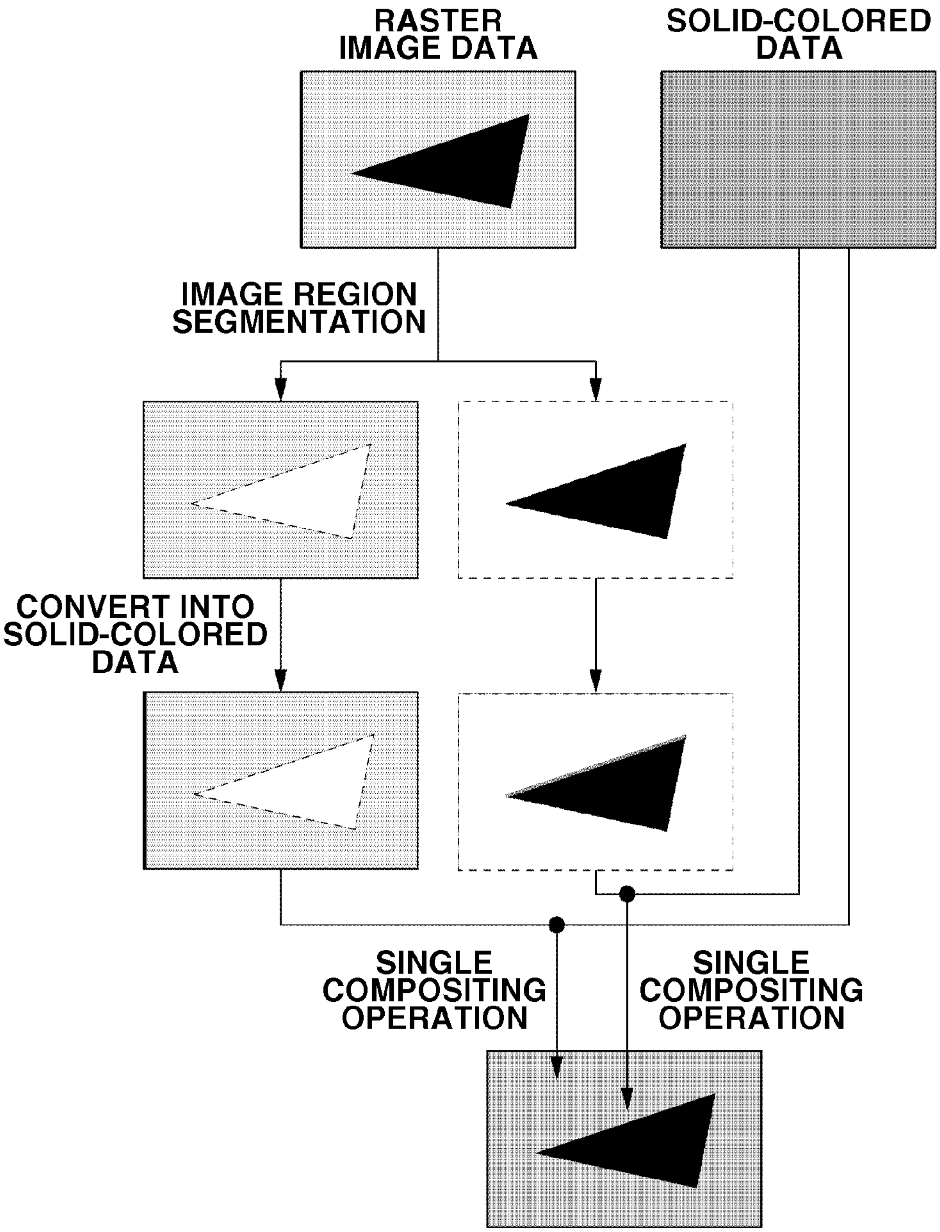
FIG. 11 illustrates a structure of job data updated through merge processing by a job data merge unit according to the first exemplary embodiment.

FIG. 11 illustrates an example of compositing processing of the flat-filled portion and the solid-colored data according to the first exemplary embodiment. Although the image region of the raster image data will be segmented into the flat-filled portion and the bit-mapped portion, the raster image data illustrated in FIG. 11 is segmented into regions of two flat-filled portions. In this case, since the compositing processing is performed between two pieces of solid-colored data, the compositing operation in rendering processing is only required once for each paint region.

Figure 12:
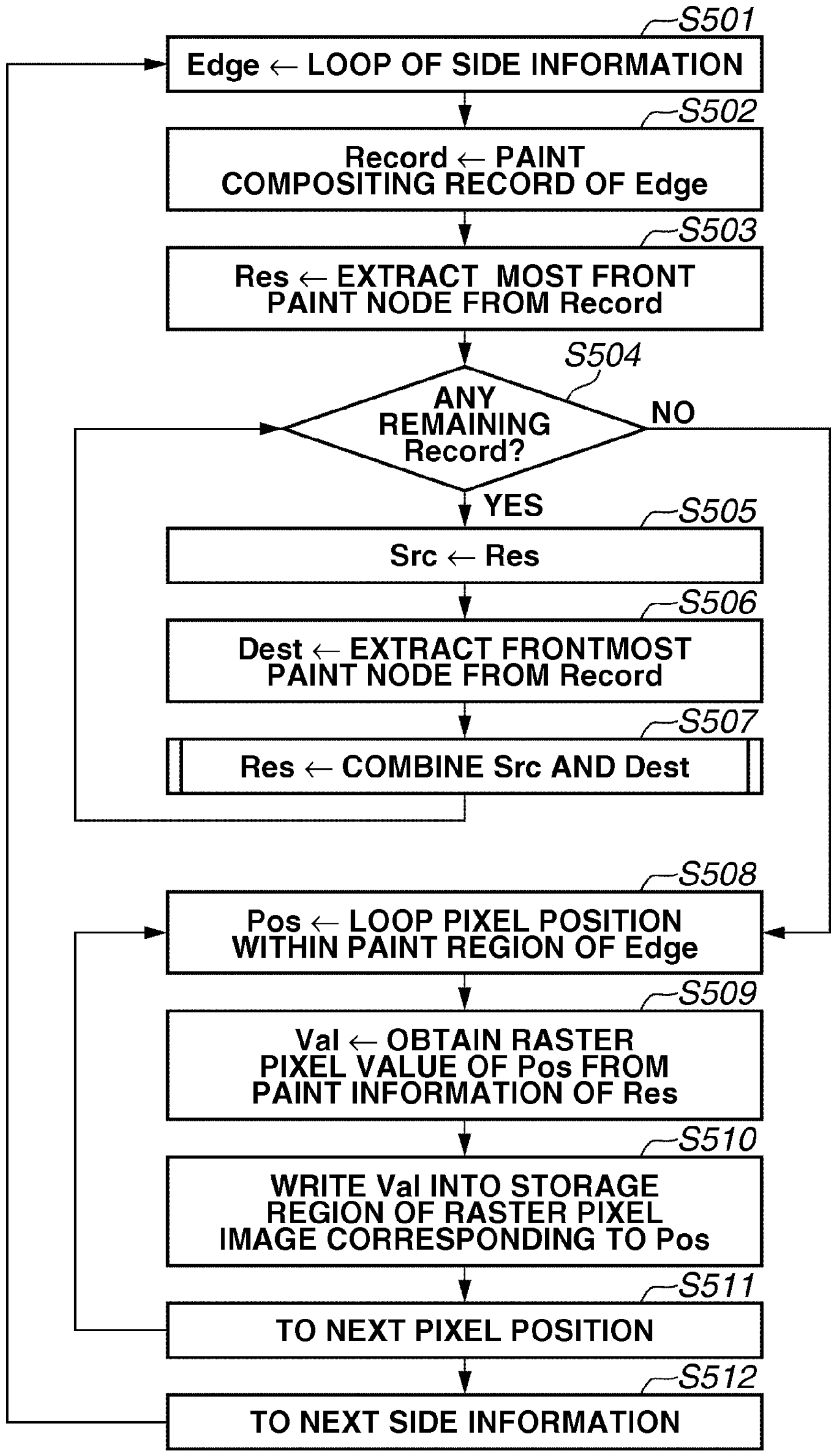
FIG. 12 is a flowchart illustrating rendering processing according to the first exemplary embodiment.

Next, rendering processing by the rendering unit 905 will be described in detail. FIG. 12 is a flowchart of rendering processing in step S203. First, in step S501, the rendering unit 905 identifies one paint region from side information within a drawing range, and substitutes it into Edge.

If the paint region has been identified (substituted into Edge) in step S501, then in step S502, the rendering unit 905 reads out a paint compositing record which the paint region refers to. If the paint compositing record has been read out in step S502, then in step S503, the rendering unit 905 extracts a foremost paint node from the paint compositing record, and substitutes the extracted paint node into Res. The paint node extracted from the paint compositing record is deleted.

If the extracted paint node has been substituted into Res in step S503, then in step S504, the rendering unit 905 determines whether a not-yet-extracted paint node remains in the paint compositing record. If it is determined that a not-yet-extracted paint node remains in the paint compositing record (YES in step S504), then in step S505, the rendering unit 905 substitutes temporarily the value of Res into Src. If the value of Res has been substituted into Src in step S505, then in step S506, the rendering unit 905 extracts a paint node from the paint compositing record and substitutes it into Dest. If the paint node has been substituted into Dest in step S506, then in step S507, the rendering unit 905 performs compositing processing on Src and Dest, and sets the result generated paint node as a new Res. Subsequent to the processing in step S507, the processing returns to step S504. In step S507, if the flat-filled portion and the solid-colored data are combined, it is required to perform a compositing operation only once. In other cases, for example, if the bit-mapped portion and the solid-colored data are combined, the compositing operation will be performed for each pixel position.

On the other hand, if it is not determined that a not-yet-extracted paint node remains in the paint compositing record (NO in step S504), the processing shifts to step S508. If the paint compositing record is empty, a paint node of a final compositing result will be placed in Res. Subsequently, in step S508, the rendering unit 905 identifies one pixel position from within the paint region, and substitutes it into Pos.

If the pixel position has been identified (substituted into Pos) in step S508, then in step S509, the rendering unit 905 reads out a raster pixel value in the identified pixel position from the compositing result Res and substitutes it into Val. If the compositing result Res has been substituted into Val in step S509, the rendering unit 905 writes the value of Val into the storage region of the raster image, since the pixel value of the raster image corresponding to Pos is set as Val. Next, in step S511, the rendering unit 905 identifies another pixel position in the paint region. After having identified the pixel position, the rendering unit 905 starts again processing from step S508. When writing operation of the raster pixel values for all pixel positions in the paint region ends, then in step S512, the rendering unit 905 shifts to processing of a next paint region. By performing processing on all paint regions within the drawing range, rendering processing in the drawing range, that is, generation of the raster image, is completed.

As described above, in the first exemplary embodiment, the raster image is segmented into the flat-filled portion and the bit-mapped portion, and the number of times of compositing operations on the flat-filled portion is reduced. As a result, high-speed rendering processing can be achieved.

Next, a second exemplary embodiment of the present invention will be described. The above-described first exemplary embodiment aims at rendering processing on the flat-filled portion of the raster image, more specifically, speeding up the compositing processing. The second exemplary embodiment is intended to achieve high-speed rendering processing on regions which are not the flat-filled portion (the bit-mapped portion according to the first exemplary embodiment) as well.

More specifically, if a transparency satisfies a predetermined condition in processing for the compositing of the bit-mapped portion and the solid-colored data, a resolution of the bit-mapped portion is reduced. Since color data of high resolution will be lost in transparent processing in which the transparency is high, it has least visual influence of a user on the bit-mapped portion after rendering operation, even when the resolution is lowered. Thus, the second exemplary embodiment aims at lowering the resolution of the bit-mapped portion in advance, reducing the number of pixels that will be a target of the compositing operation, and thus achieving speeding-up of the rendering processing.

Figure 13:
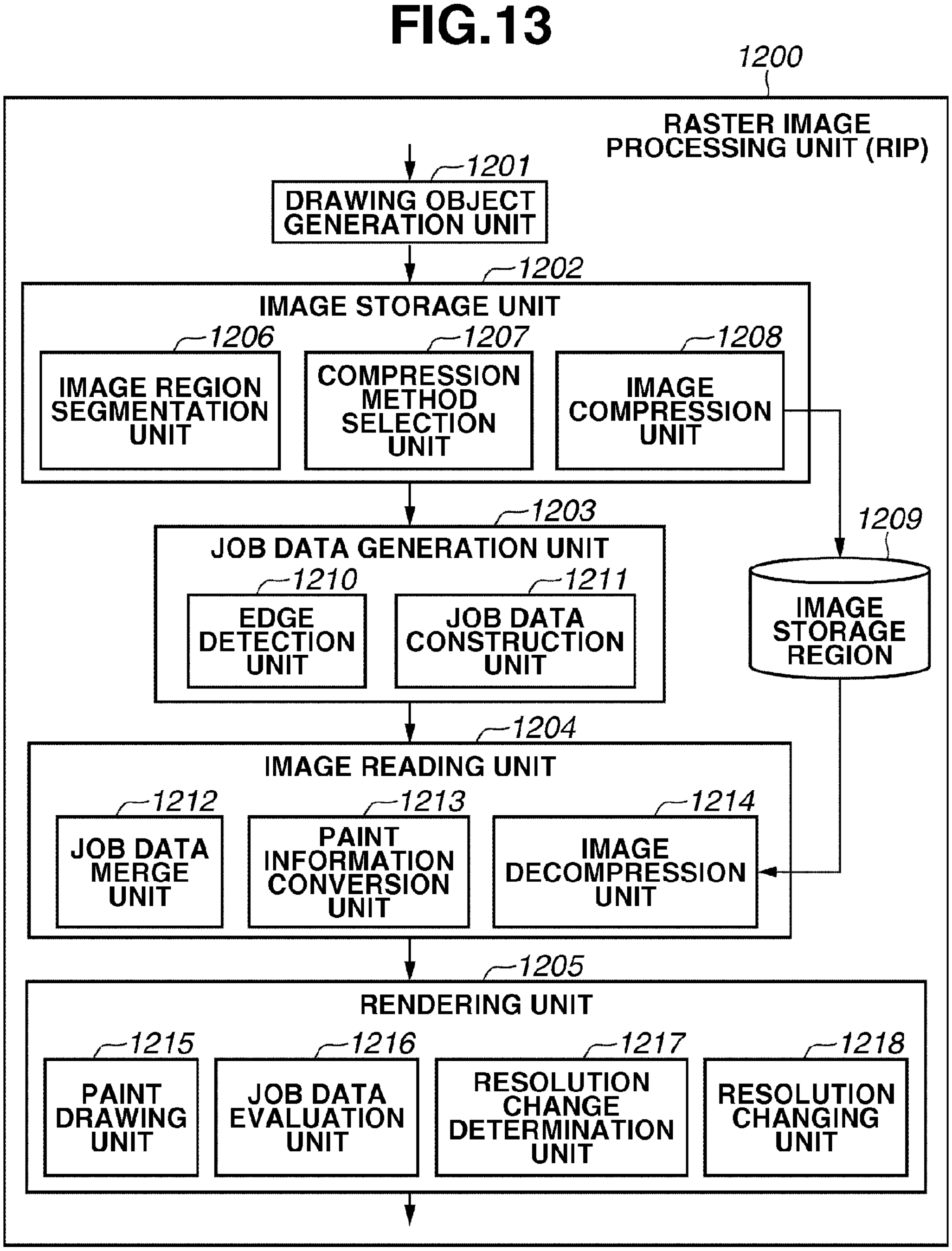
FIG. 13 illustrates a configuration of the RIP according to a second exemplary embodiment of the present invention.

First, a configuration of a RIP 1200 according to the second exemplary embodiment will be described. FIG. 13 illustrates a configuration of the RIP 1200 according to the second exemplary embodiment. A different point from the first exemplary embodiment lies in that a resolution change determination unit 1217 and a resolution changing unit 1218 are added to the rendering unit 1205.

The resolution change determination unit 1217 determines whether a resolution of the raster image (bit-mapped portion) in the paint information should be changed. If it is determined by the resolution change determination unit 1217 that the resolution should be changed, the resolution changing unit 1218 changes the resolution of the raster image (bit-mapped portion).

Next, resolution change processing will be described. In the second exemplary embodiment, a step S506.5 (not illustrated) is added between steps S506 and S507 in the flowchart in FIG. 12. The step S506.5 is a step for changing resolutions of Src and Dest.

Figure 14A:
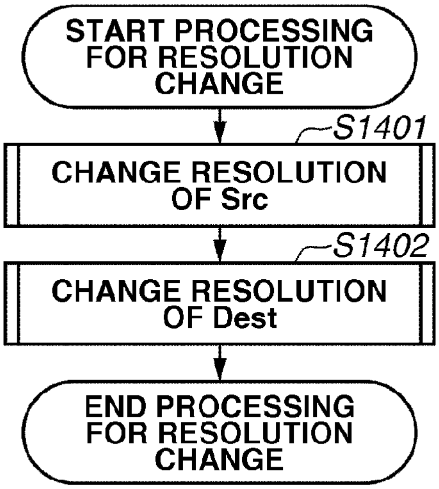
FIGS. 14A and 14B are flowcharts illustrating resolution change processing according to the second exemplary embodiment.
Figure 14B:
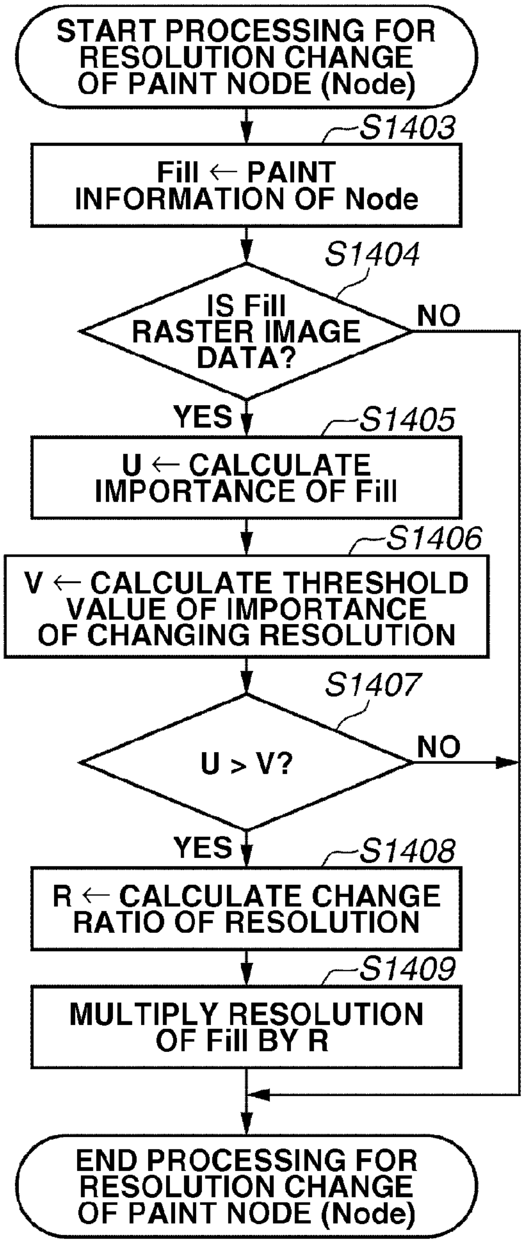

Processing in step S506.5 will be described. FIGS. 14A and 14B illustrate resolution change processing according to step S506.5. In steps S1401 and S1402 in FIG. 14A, the rendering unit 1205 performs resolution change of Src and Dest separately. The flowchart that has described resolution change processing more in detail is FIG. 14B.

First, in step S1403, the rendering unit 1205 substitutes a paint node of either one of Src or Dest into Node, and sets paint information which Node refers to, to Fill. If the rendering unit 1205 has substituted Fill into Node in step S1403, then in step S1404, the rendering unit 1205 determines whether Fill is raster image data. If it is determined that Fill is raster image data (YES in step S1404), then in step S1405, the rendering unit 1205 calculates importance U of Fill. Importance is a numerical value representing to what degree each raster image exerts influence on the raster image after rendering. A calculation method is given as follows, for example, using the equation $U=W1(Fill)/S1(Fill)$, where W1 is a function for weighting a transparency of the raster image, and is defined by $\alpha$ value×constant. S1 is a function for obtaining the number of pixels of the raster image data. The importance U calculated as above represents a weight of transparency per pixel in the raster image data, in a model in which the weight of transparency is direct proportional to the number of pixels.

Then, in step S1406, the rendering unit 1205 calculates a threshold value V of importance of changing a resolution. A calculation method is given as follows, for example, using the equation V=W2(Edge)/S2(Edge). The threshold value V of importance represents a weight of transparency per pixel to be rendered in a paint region of Edge. W2 and S2 are defined similar to W1 and S1, respectively. However, in an exemplary embodiment in which transparency is not set for the paint region itself, W2 is defined by a constant, without depending on an argument (parameter). If U is larger than V in step S1407, that is, if the weight of transparency of the raster image is larger than the weight of transparency to be rendered in the paint region, then in step S1408, the rendering unit 1205 calculates a change ratio R of the resolution. R is given by the equation $R=\sqrt{(V/U)}$. Finally, in step S1409, the rendering unit 1205 multiplies the resolution by R.

As described above, by changing the resolution to a low resolution and thinning color data of the raster image, speeding-up of the rendering processing can be achieved with respect to a region that is not the flat-filled portion as well. If transparency of the flat-filled image is higher than a predetermined value, speeding-up of the rendering processing can be implemented, even when the compositing operation is performed by changing the resolution of the bit-mapped portion.

Next, a third exemplary embodiment of the present invention will be described. The third exemplary embodiment, similar to the second exemplary embodiment, is intended to achieve speeding-up of the rendering processing, with respect to a region that is not the flat-filled portion (the bit-mapped portion according to the first exemplary embodiment).

More specifically, in processing for the compositing of the bit-mapped portion and the solid-colored data, color data of the bit-mapped portion is quantized, provided that a predetermined condition relating to transparency is satisfied. In transparent processing in which a transparency is high, color data with a high definition will be lost. As a result, it has least visual influence, even when the color data of the bit-mapped portion is quantized.

In this case, in a compositing operation of the rendering processing according to the third exemplary embodiment, the pixel values of a result of the compositing operation are to be cached into a random-access memory (RAM). Speeding-up of the rendering processing can be achieved by skipping a compositing operation for pixels with the same pixel values as the already cached pixel values.

Figure 15:
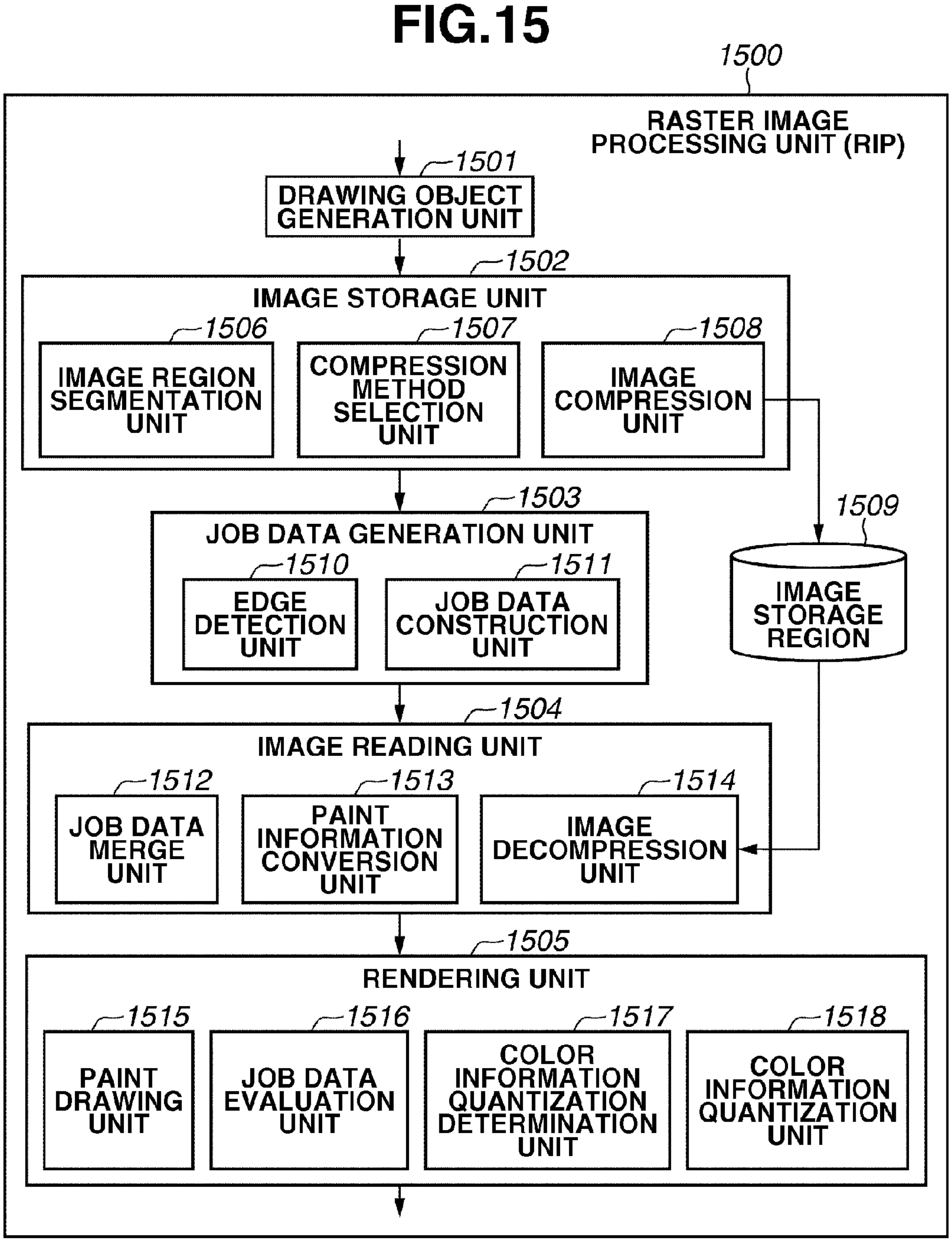
FIG. 15 illustrates a configuration of the RIP according to a third exemplary embodiment of the present invention.

First, a configuration of a RIP 1500 according to the third exemplary embodiment will be described. FIG. 15 illustrates the RIP 1500 according to the third exemplary embodiment. A different point from the first exemplary embodiment lies in that the rendering unit 1505 includes a color information quantization determination unit 1517 and a color information quantization unit 1518. The third exemplary embodiment is configured such that the resolution changing unit 1218 and the resolution change determination unit 1217 according to the second exemplary embodiment are replaced by the color information quantization unit 1518 and the color information quantization unit 1517. Quantization of color data includes quantization of RGB 24-bit color into RGB 16-bit color as an example. Color data of the bit-mapped portion as paint information of the bit-mapped portion is thus decreased by quantization.

Figures 16A, 16B, 16C:
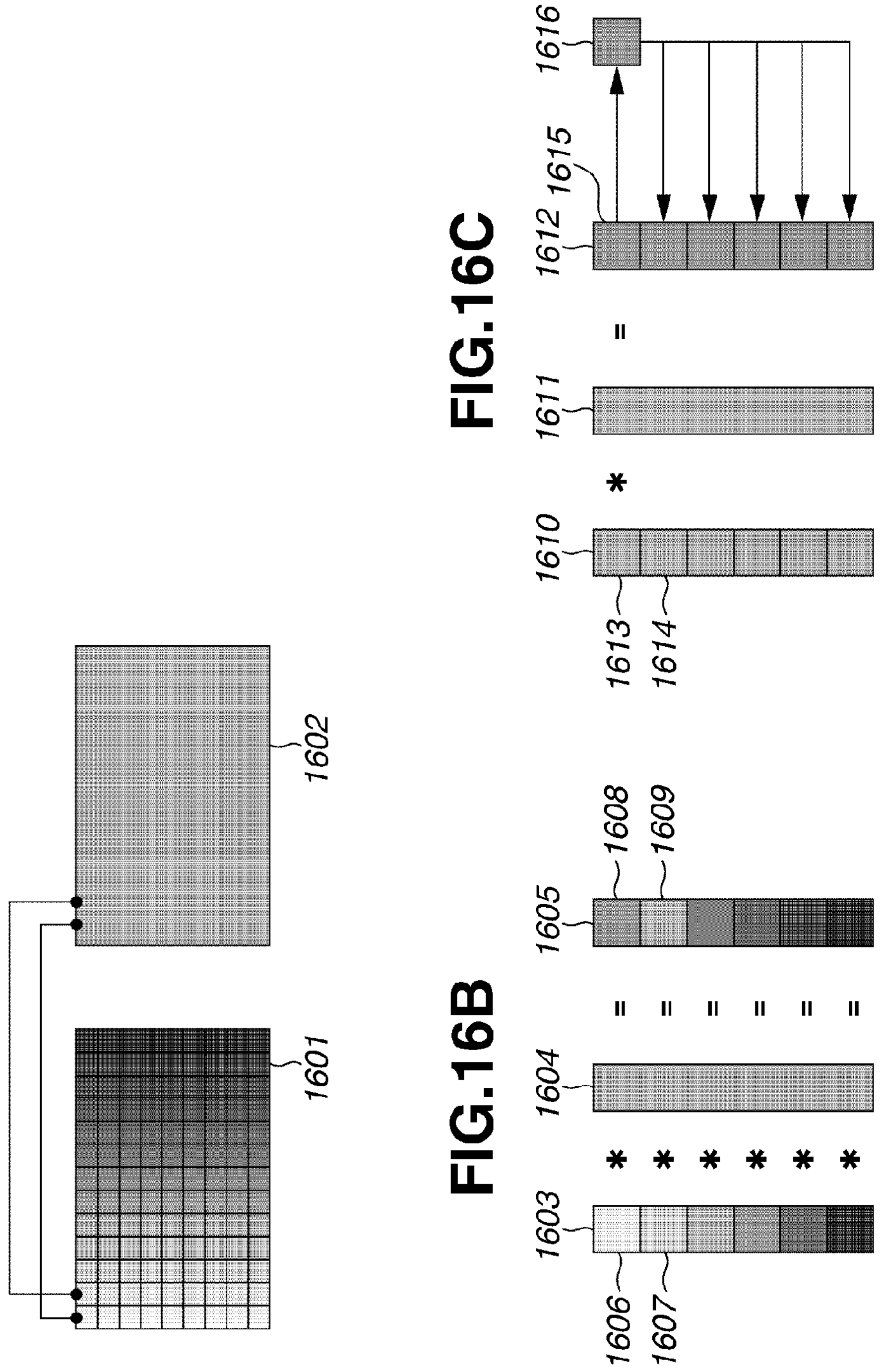
FIGS. 16A to 16C illustrate quantizing processing by a rendering unit according to the third exemplary embodiment.

As illustrated in FIG. 16A, before the third exemplary embodiment is applied, the RIP 1500 performs a compositing operation on a bit-mapped portion 1601 and solid-colored data 1602 for each pixel position. FIG. 16B illustrates the manner in greater detail. In FIG. 16B, the RIP 1500 performs compositing operations on a subset 1603 of pixel values included in the bit-mapped portion 1601 and pixel values 1604 of the solid-colored data 1602 for each pixel position. A result of the compositing operations is pixel values 1605. A result 1608 of the compositing operation on a pixel value 1606 and the pixel value 1604 is obtained. Further, a result 1609 of the compositing operation on a pixel value 1607 and the pixel value 1604 is obtained.

Next, processing for quantizing color data of the bit-mapped portion and performing a compositing operation will be described. First, the RIP 1500 quantizes color data of the bit-mapped portion. This is illustrated in FIG. 16C. In FIG. 16C, a subset 1610 of the pixel values included in the bit-mapped portion 1601 is such that color data of the bit-mapped portion has all the same pixel value. Just like the above description, a result of the compositing operation on a pixel value 1613 and a pixel value 1611 becomes a pixel value 1615. At this time, the pixel value 1615 is cached in a pixel value variable 1616. The pixel value variable 1616 is implemented by the RAM.

Next, before performing a compositing operation on the pixel value 1614 and the pixel value 1611, the RIP 1500 determines whether a combination of the pixel values is the same as that in the preceding compositing operation. If not the same, the RIP 1500 performs a similar compositing operation again, and substitutes the pixel value of the result into the pixel value variable 1616. If the same, without performing the compositing operation, the RIP 1500 reads out the pixel value substituted (cached) into the pixel value variable 1616, as the result. The RIP 1500 sets the read-out pixel value as the result of the compositing operation. For example, the combination of the pixel value 1613 and the pixel value 1611 is the same as the combination of the pixel value 1614 and the pixel value 1611, and consequently the RIP 1500 reads out the pixel value cached in the pixel value variable 1616. Hereinbefore, processing for quantizing color data of the bit-mapped portion and performing a compositing operation have been described.

Processing for determining whether quantization is to be performed is the same as the processing illustrated in FIGS. 14A and 14B. That is, if a transparency of the bit-mapped portion exceeds a predetermined value, quantization is performed. The change lies in that a step for performing quantization is added in place of steps S1408 and S1409. As described above, in the third exemplary embodiment, speeding-up of the rendering processing can be achieved by performing quantization of the color data depending on the transparency, with respect to a region that is not the flat-filled portion, and performing caching of the compositing operation result.

Alternative exemplary embodiments as described below are also conceivable. In the image region segmentation, a region in which the number of used colors is equal to or smaller than a threshold value may be used as a segmentation candidate, and compression and decompression suitable for the image region may be implemented. A processing method for performing a compositing operation with respect to not only Src and Des, but also three or more paint nodes may be used. In processing for resolution change or color information quantization, a computation method of importance may be defined for each hue, or whether a transparency is equal to or greater than the threshold value may be used as a condition, without using the importance. Instead of a mode for performing the above-described processing separately on Src and Dest, a mode for determining a condition relating to both of Src and Dest and performing the above-described processing on either or both of Src and Dest may be used. Moreover, a configuration of using the first, second, and third exemplary embodiments in combination may be used.

Aspects of the present invention can also be realized by a computer of a system or apparatus (or devices such as a CPU, micro-processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-045543 filed Mar. 2, 2010, which is hereby incorporated by reference herein in its entirety.

What is claimed is:

1. An apparatus comprising:

a generation unit configured to generate a bit-mapped object in which color data is defined with respect to each pixel position of a region where same-colored data does not continue in a range of equal to or greater than a threshold value, and a flat-filled object in which color data is defined with respect to a region where same-colored data continues in a range of equal to or greater than the threshold value, from a raster image in which color data is defined for each pixel position; and a drawing unit configured to, when combining two objects including the bit-mapped object generated by the generation unit and a solid-colored object in which color data is defined with respect to an object, perform a compositing operation on color data of the bit-mapped object and color data of the solid-colored object in a region where the two objects overlap each other for each pixel position, and write each color data which has been subjected to the compositing operation into each pixel position in the region where the two objects overlap each other, and when combining two objects including the flat-filled object generated by the generation unit and the solid-colored object, perform a compositing operation once on color data of the two objects, and write color data which has been subjected to the compositing operation into each pixel position in a region where the two objects overlap each other, wherein contour points are extracted with regard to regions where the two objects overlap each other to detect the regions divided by the objects, and wherein numbers of compositing operations are different between operations on the bit-mapped object and the solid-color object and operations on the flat-filled object and the solid-colored object and the number of compositing operations on the bit-mapped object and the solid-colored object is more than the number of compositing operations on the flat-filled object and the solid-colored object.

2. The apparatus according to claim 1, further comprising a resolution changing unit configured to, if a transparency concerning a region in which the bit-mapped object generated by the generation unit is drawn is larger than a predetermined value, lower a resolution of the bit-mapped object, wherein the drawing unit, when combining two objects including the bit-mapped object generated by the generation unit and the solid-colored object, performs a compositing operation on color data of the bit-mapped object and color data of the solid-colored object for each pixel position in a region where the two objects including the bit-mapped object of which the resolution has been changed by the resolution changing unit and the solid-colored object overlap each other, and writes the pixel values which has been subjected to the compositing operation into each pixel position, and wherein the resolution changing unit raises a resolution of an object of compositing as a result of combining the bit-mapped object of which the resolution has been changed by the resolution changing unit and the solid-colored object.

3. The apparatus according to claim 1, further comprising a quantization unit configured to quantize color data of the bit-mapped object if a transparency concerning a region where the bit-mapped object generated by the generation unit is drawn is larger than a predetermined value, wherein the drawing unit, when combining two objects including the bit-mapped object generated by the generation unit and the solid-colored object, performs a compositing operation on color data of the bit-mapped object and color data of the solid-colored object in a region where the two objects including the bit-mapped object in which color data has been quantized by the quantization unit and the solid-colored object overlap each other, stores pixel values which has been subjected to the compositing operation, and with respect to pixels having the same pixel values as the pixel values that have been subjected the compositing operation, writes the stored pixel values without performing a compositing operation.

4. A printing apparatus comprising:

a generation unit configured to generate a bit-mapped object in which color data is defined with respect to each pixel position of a region where same-colored data does not continue in a range of equal to or greater than a threshold value, and a flat-filled object in which color data is defined with respect to a region where same-colored data continues in a range of equal to or greater than the threshold value, from a raster image in which color data is defined for each pixel position;

a drawing unit configured to, when combining two objects including the bit-mapped object generated by the generation unit and a solid-colored object in which color data is defined with respect to an object, perform a compositing operation on color data of the bit-mapped object and color data of the solid-colored object in a region where the two objects overlap each other for each pixel position, and write each color data which has been subjected to the compositing operation into each pixel position in the region where the two objects overlap each other, and when combining two objects including the flat-filled object generated by the generation unit and the solid-colored object, perform a compositing operation once on color data of the two objects, and write color data which has been subjected to the compositing operation into each pixel position in a region where the two objects overlap each other; and a printing unit configured to print a result written into each pixel position by the drawing unit, wherein contour points are extracted with regard to regions where the two objects overlap each other to detect the regions divided by the objects, and wherein numbers of compositing operations are different between operations on the bit-mapped object and the solid-color object and operations on the flat-filled object and the solid-colored object and the number of compositing operations on the bit-mapped object and the solid-colored object is more than the number of compositing operations on the flat-filled object and the solid-colored object.

5. A drawing method comprising:

generating a bit-mapped object in which color data is defined with respect to each pixel position of a region where same-colored data does not continue in a range of equal to or greater than a threshold value, and a flat-filled object in which color data is defined with respect to a region where same-colored data continues in a range of equal to or greater than the threshold value, from a raster image in which color data is defined for each pixel position;

when combining two objects including the generated bit-mapped object and a solid-colored object in which color data is defined with respect to an object, performing a compositing operation on color data of the bit-mapped object and color data of the solid-colored object in a region where the two objects overlap each other for each pixel position, and writing each color data which has been subjected to the compositing operation into each pixel position in the region where the two objects overlap each other; and when combining two objects including the generated flat-filled object and the solid-colored object, performing a compositing operation once on color data of the two objects, and writing color data which has been subjected to the compositing operation into each pixel position in a region where the two objects overlap each other, wherein contour points are extracted with regard to regions where the two objects overlap each other to detect the regions divided by the objects, and wherein numbers of compositing operations are different between operations on the bit-mapped object and the solid-color object and operations on the flat-filled object and the solid-colored object and the number of compositing operations on the bit-mapped object and the solid-colored object is more than the number of compositing operations on the flat-filled object and the solid-colored object.

6. A non-transitory computer-readable storage medium storing computer-executable instructions for causing a computer to execute a drawing method comprising:

generating a bit-mapped object in which color data is defined with respect to each pixel position of a region where same-colored data does not continue in a range of equal to or greater than a threshold value, and a flat-filled object in which color data is defined with respect to a region where same-colored data continues in a range of equal to or greater than the threshold value, from a raster image in which color data is defined for each pixel position;

when combining two objects including the generated bit-mapped object and a solid-colored object in which color data is defined with respect to an object, performing a compositing operation on color data of the bit-mapped object and color data of the solid-colored object in a region where the two objects overlap each other for each pixel position, and writing each color data which has been subjected to the compositing operation into each pixel position in the region where the two objects overlap each other; and when combining two objects including the generated flat-filled object and the solid-colored object, performing a compositing operation once on color data of the two objects, and writing color data which has been subjected to the compositing operation into each pixel position in a region where the two objects overlap each other, wherein contour points are extracted with regard to regions where the two objects overlap each other to detect the regions divided by the objects, and wherein numbers of compositing operations are different between operations on the bit-mapped object and the solid-color object and operations on the flat-filled object and the solid-colored object and the number of compositing operations on the bit-mapped object and the solid-colored object is more than the number of compositing operations on the flat-filled object and the solid-colored object.

* * * * *